UNITED STATES PATENT OFFICE.

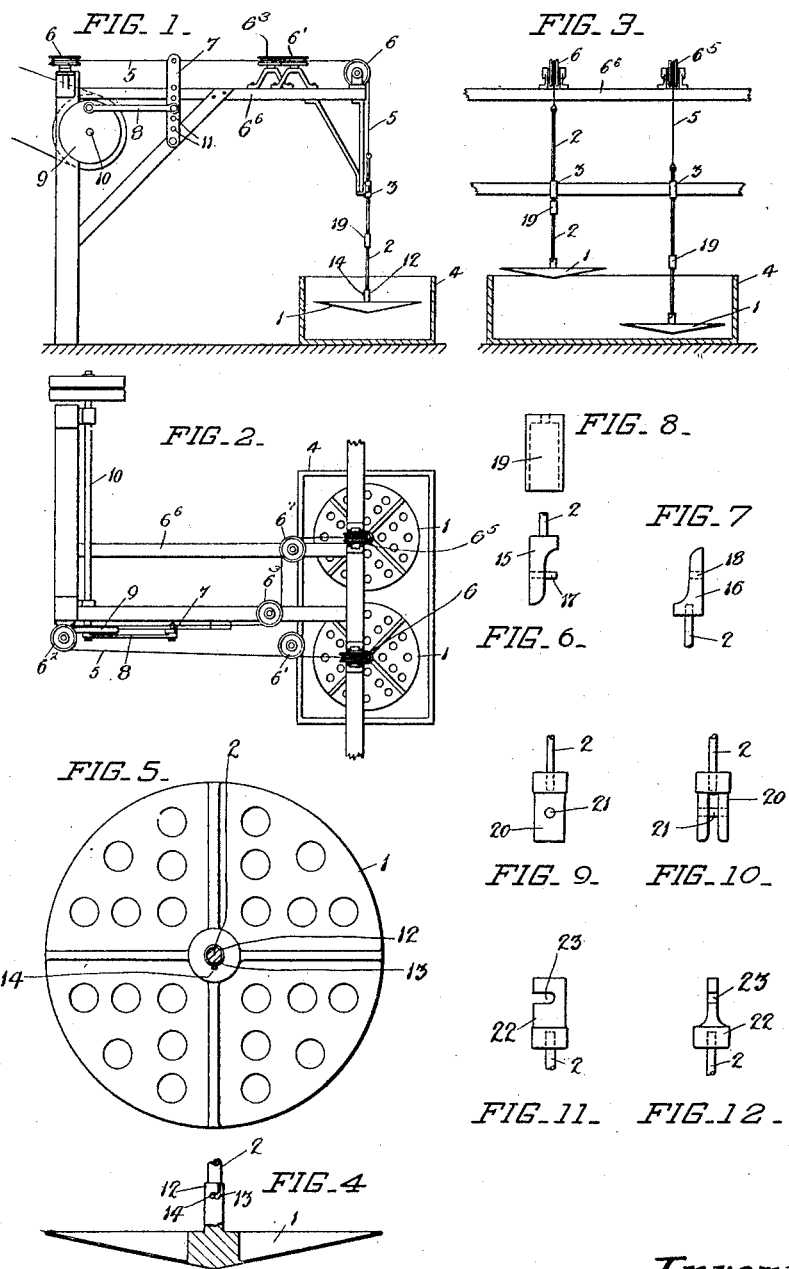

JOHN CHARLES KENNEDY, OF MATAMATA, AUCKLAND, NEW ZEALAND.

AGITATOR FOR MILK AND OTHER LIQUIDS.

1,358,317. Specification of Letters Patent. Patented Nov. 9, 1920.

Application filed January 27, 1920. Serial No. 354,323.

*To all whom it may concern:*

Be it known that I, JOHN CHARLES KENNEDY, a citizen of the Dominion of New Zealand, of Glaxo Factory, Matamata, Auckland, in the provincial district of Auckland, a subject of the King of Great Britain and Ireland, have invented certain new and useful Improvements in Agitators for Milk and other Liquids, of which the following is a specification.

This invention relates to means employed for agitating milk, cream and other liquids.

The object of the invention is to provide an improved agitator for use in dealing with milk, cream, and any liquid where agitation to insure circulation and thorough mixing and even distribution of the component parts or elements, requires to be effected in a quiet, gentle manner.

According to the invention, a number of perforated plates or disks are mounted on the lower ends of vertical rods working in guides over a vat or container, and operated by a rope passing over and around pulleys, said rope being attached to a rocking arm suitably operated.

When a pair only of plates or disks are employed the rope is attached at one end of the rods, and passes over and around the pulleys, the other end being attached to the other rod, so that when one plate or disk is lowered into the vat or container, the other plate or disk is raised out of same.

When more than a pair of plates or disks are used, the latter are arranged in rows, the rods of one row all being connected to one end of the rope, and the rods of the other row to the other end of the rope, so that as one row of plates or disks ascends, the plates or disks of the other row descend.

The rocking arm attached to said rope has motion imparted thereto through a connecting rod, from a disk or crank on a suitably driven shaft.

Provision is made for disconnecting the plates or disks from the lower ends of the vertical rods and also for uncoupling the lower portions of the latter from their upper portions.

The invention is illustrated in the accompanying drawing in conjunction with which it will be more particularly described:—

Figure 1 being an end view of the apparatus.

Fig. 2 a plan view,

Fig. 3 a side view,

Figs. 4 and 5 an enlarged sectional view and plan view respectively of a perforated plate or disk.

Figs. 6 and 7 enlarged views of the portions of a coupling secured to the upper and lower portions respectively of a plate or disk rod.

Fig. 8 an enlarged view of a coupling sleeve slidable on the upper portion of a plate or disk rod.

Figs. 9 and 10 enlarged side and edge views respectively of the portion of an alternative form of coupling secured to the upper portion of a plate or disk rod.

Figs. 11 and 12 enlarged side and edge views respectively of the portion of the coupling secured on the lower portion of a plate or disk rod and fitting into the portion shown in Figs. 9 and 10.

Preferably an even number of perforated plates or disks 1 are mounted on the lower ends of vertical rods 2 working in guides 3 over a vat or container 4, said plates or disks 1 when more than a pair are used being arranged in two rows.

One rod 2 or all the rods 2 of one row is or are connected to one end of a rope 5 passing over and around pulleys 6, 6', 6², 6³, 6⁴ and 6⁵ the other rod 2 or all the rods 2 of the other row being connected to the other end of said rope 5.

The pulleys are carried by a frame 6⁶ and the pulleys 6 and 6⁵ are mounted on the forward portion of this frame on horizontal axes, the pulleys 6', 6³ and 6⁴ are located on an intermediate portion of the frame and have vertical axes and the pulley 6² is mounted upon the rear portion of the frame and has a vertical axis. The flexible member or rope 5 passes upwardly from one of the dasher rods 2 over the pulley 6, then rearwardly over the pulleys 6' and 6², then forwardly over the pulley 6³, then laterally over the pulley 6⁴, then forwardly over the pulley 6⁵, and then downwardly to the other dasher rod 2.

The rope 5 is of such a length that when one plate or disk 1 (when a pair only is employed) is raised the other plate or disk 1 is lowered, or when two rows are employed, so that as one row ascends the other row descends.

The rope 5 is operated to raise and permit the lowering of the disk 1, by being connected to a rocking arm 7, to which movement is imparted through a connecting rod 8 from a disk or crank 9 on a suitably driven shaft 10.

The arm 7 has a number of holes 11 therein in order that the rod 8 can be adjusted to increase or shorten the movement of the plates or disks 1, by increasing or shortening the stroke of the arm 7.

The plates or disks 1 are provided with sleeves 12 in which are bayonet slots 13 which engage pins 14 on the lower ends of the rods 2, whereby said plates or disks can be easily removed from the rods 2 for cleaning or other purposes.

The rods 2 are in halves, the upper half of each rod having secured thereto at its lower end a portion 15 (Fig. 6) of a coupling shaped to fit a corresponding portion 16 (Fig. 7) on the upper end of the lower half of a rod.

The projection 17 on the portion 15 engages a hole 18 in the portion 16 and a sleeve 19 (Figs. 1, 3 and 8) slidable on the upper rod half incases the two portions 15 and 16 and holds them together.

The alternative form of coupling illustrated in Figs. 9 to 12 consists of a forked portion 20 with a fixed cross pin 21 through same, and attached to the lower end of an upper rod half.

On the upper end of the lower rod half is a portion 22 slotted at 23, said portion 22 fitting in the forked portion 20 so that the slot 23 engages the cross pin 21.

What I do claim and desire to secure by Letters Patent of the United States is:—

A structure of the class described comprising a supporting frame having forward and rearward portions, spaced guides on said forward portion and a guide on said rear portion, forwardly and rearwardly reciprocating means on said frame between said forward and rear portions, and a flexible member having one free end suspended over one of said guides on said forward portion and guided rearwardly to said reciprocating means and then extended rearwardly around said rear guide and forwardly down over said other guide on said forward portion, and operative members suspended from the suspended free ends of said flexible member.

In testimony whereof I affix my signature in presence of two witnesses.

JOHN CHARLES KENNEDY.

Witnesses:
 WILLIAM PINCHE,
 DORIS ELLEN RAPSON.